| United States Patent [19]
Albert | [11] Patent Number: 4,658,174
[45] Date of Patent: Apr. 14, 1987 |

[54] VIBRATING BEAM FORCE TRANSDUCER WITH ANGLED ISOLATOR SPRINGS

[75] Inventor: William C. Albert, Parsippany, N.J.

[73] Assignee: The Singer Company-Kearfott Division, Little Falls, N.J.

[21] Appl. No.: 841,982

[22] Filed: Mar. 20, 1986

[51] Int. Cl.⁴ .......................................... H01L 41/08
[52] U.S. Cl. .................... 310/323; 310/321; 310/367; 310/329; 73/517 AV
[58] Field of Search ............... 310/321, 323, 324, 338, 310/367, 368, 361, 25, 330–332, 329; 73/778, 777, 781, 141 R, DIG. 1, DIG. 4, 517 R, 517 AV; 29/25.35; 338/2, 47; 357/26

[56] References Cited

U.S. PATENT DOCUMENTS

| 3,238,789 | 3/1966 | Erdley | 73/517 |
| 3,269,192 | 8/1966 | Southworth et al. | 73/517 |
| 3,399,572 | 9/1968 | Riordan et al. | 73/398 |
| 3,413,859 | 12/1968 | Riordan | 74/5.4 |
| 3,440,888 | 4/1969 | Southworth et al. | 73/517 |
| 3,465,597 | 9/1969 | Riordan et al. | 73/517 |
| 3,470,400 | 9/1969 | Weisbord | 310/323 X |
| 3,479,536 | 11/1969 | Norris | 310/8.5 |
| 3,486,383 | 12/1969 | Riordan | 73/517 |
| 3,505,866 | 4/1970 | Weisbord et al. | 73/141 |
| 3,969,640 | 7/1976 | Standte | 310/911 |
| 4,104,920 | 8/1978 | Albert et al. | 73/517 AV |
| 4,221,131 | 5/1979 | Albert | 73/517 AV |
| 4,321,500 | 3/1982 | Paros et al. | 310/323 X |
| 4,377,765 | 3/1983 | Kogure et al. | 310/312 |
| 4,445,065 | 4/1984 | Albert | 310/323 X |
| 4,446,394 | 5/1984 | Albert | 310/321 |
| 4,447,853 | 5/1984 | Ochiai | 310/312 |
| 4,544,858 | 10/1985 | Nishiyuchi | 310/321 |

OTHER PUBLICATIONS

Albert, William C., "Vibrating Quartz Crystal Beam Accelerometer," ISA, 1982, pp. 33–44.
Albert, William C., "Vibrating Beam Accelerometer for Strapdown Applications," IEEE, 1982, pp. 319–322.
Albert, William C., "Force Sensing Using Quartz Crystal Flexure Resonators," IEEE, 1984, pp. 233–239.
Serra, Technical Report on the Quartz Resonator Digital Accelerometer, AGARD Conference, May 1968, pp. 487–516.
Albert, Single Isolator Beam Resonator, Jul., 1978.
Albert, Quartz Crystal Flexure Resonator, 1985.

*Primary Examiner*—Mark O. Budd
*Attorney, Agent, or Firm*—Pennie & Edmonds

[57] ABSTRACT

An isolation system which prevents energy from being transferred by the vibrating member of a resonator to its end mounts is formed by having isolator springs coupled to respective isolation masses. Each of the isolation masses is connected to a corresponding end mount. Each pair of isolator springs is angled in such a way that the axes of the isolator springs would intersect at a node located somewhere along the longitudinal axes of the vibrating member. Consequently, the axes of the isolator springs are positioned perpendicularly to loci of motions representing the direction of force and moment reactions produced at the roots of the vibrating member.

11 Claims, 12 Drawing Figures

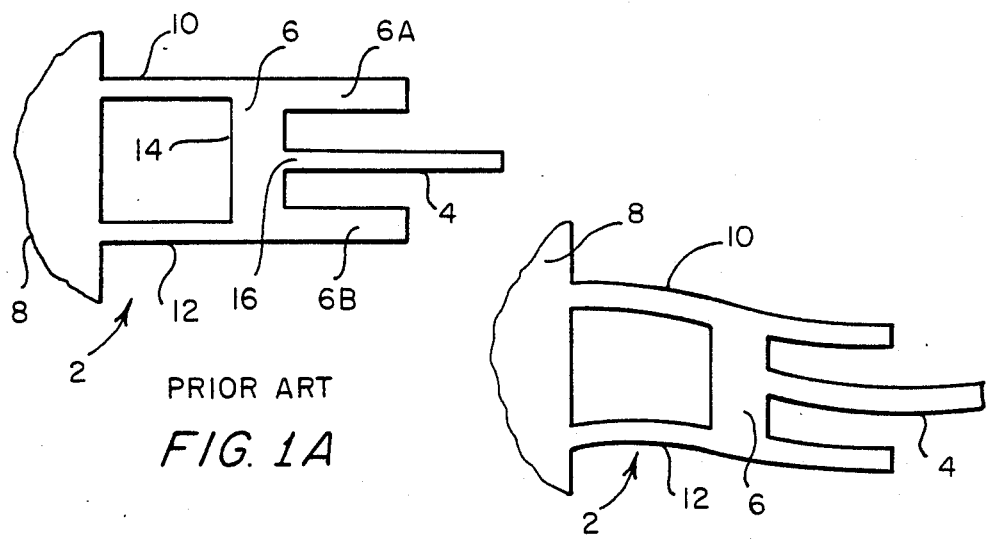
FIG. 1A PRIOR ART
FIG. 1B PRIOR ART
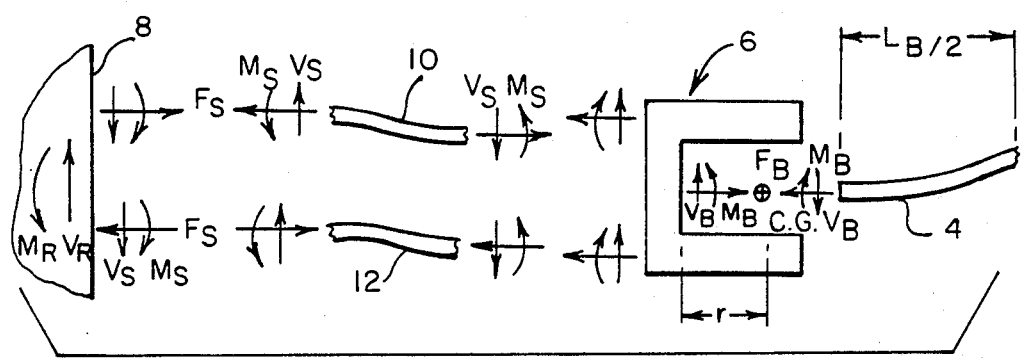
FIG. 2
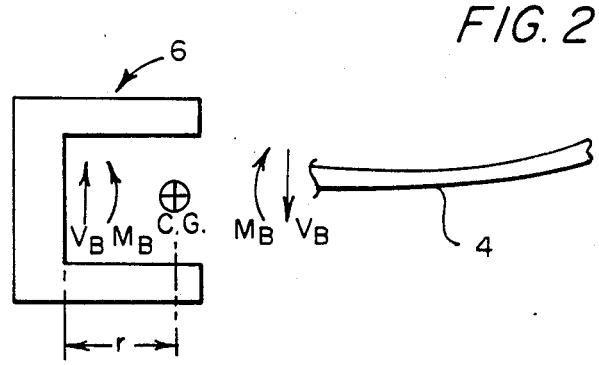
FIG. 3

FIG. 10 A-FRAME RESONATOR

VIBRATING BEAM FORCE TRANSDUCER WITH ANGLED ISOLATOR SPRINGS

FIELD OF THE INVENTION

The present invention relates in general to vibrating beam resonators, and more particularly to the isolation system of a vibrating beam resonator.

BRIEF DESCRIPTION OF THE PRIOR ART

A vibrating beam resonator is used in a vibrating beam accelerometer for measuring the acceleration of aircraft or for use in missile applications. A vibrating beam has a structure which has certain string-like properties in that, if tension is put on the vibrating beam, the frequency of vibration is increased. Conversely, if compression is applied to the vibrating beam, the frequency of the vibration decreases in response to the force applied. Hence, by using a vibrating beam resonator, an output can be obtained which is representative of the force applied to the vibrating beam resonator. This output, since it can be measured in a digital format, can easily be interfaced with the present-day digital computers. Also, from this measurement, the velocity of a vehicle and the distance which the vehicle has traveled can easily be ascertained.

However, in order to make an accurate determination of the force, it is desirable that the vibration frequency of the vibrating beam be a true and accurate representation of the axial stress applied to it. Yet, since the vibrating beam is connected to mounting means, there is always some energy loss due to the fact that the mounting means must resist the forces and moments generated by the vibrating beam. This results in a decrease in the Q factor of the resonator, that is, the ratio of total energy per cycle to the energy lost per cycle. And a decrease in Q means that the frequency stability of the resonator is degraded. Thus, in order to limit the energy loss in the resonator, a high Q must be maintained.

A prior art isolation mounting system for a resonator is disclosed in U.S. Pat. No. 3,470,400, issued to Weisbord, and assigned to the assignee of the present application. According to Weisbord, to eliminate the energy loss, the center of gravity of the isolator mass, which is secured to the vibrating beam, has to be located at a very precise location along the plane of the longitudinal axis of the vibrating beam. By being so positioned, Weisbord teaches that the axial reactions may be canceled. However, oftentimes the criteria as set forth by Weisbord are difficult to attain. For example, were it desirable to move the center of gravity of the isolator mass from what was prescribed by Weisbord to a location which is further out from the vibrating beam, an additional amount of weight has to be added to the isolator mass, thereby causing different types of problems because the structure no longer adheres to the set criteria.

BRIEF DESCRIPTION OF THE PRESENT INVENTION

The present invention achieves a successful resolution of the aforesaid problems by, instead of concentrating on the center of gravity of the isolator mass, looking at the positioning of the isolator springs, which are used to connect the isolator mass to the mounting means. Therefore, there is provided more flexibility in terms of the design geometry of the isolation system of a resonator.

Moreover, by using the present invention in conjunction with the teachings of Weisbord, a design of an isolation system for a resonator which eliminates unwanted resonances near the fundamental frequency of the vibrating beam can be achieved.

The above-mentioned objects and advantages of the present invention will be more clearly understood when considered in conjunction with the accompanying drawings, in which:

BRIEF DESCRIPTION OF THE FIGURES

FIGS. 1A and 1B are prior art resonator structures as set forth in the Weisbord patent;

FIG. 2 shows an expanded three-body diagram of the structure shown in FIG. 1A;

FIG. 3 is a view which shows only the major reactions of the three-body diagram of FIG. 2;

DETAILED DESCRIPTION OF THE INVENTION

Figure 4:
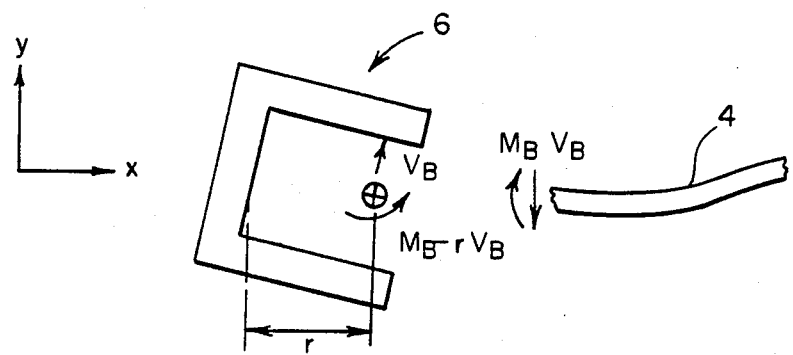
FIG. 4 depicts the transferring of reactions to the center of gravity of the structure shown in FIG. 3.

Referring now to FIG. 1, there is shown a vibrating beam structure as disclosed in the Weisbord patent mentioned hereinabove. For the sake of clarity, only half of the structure designated as 2 is depicted. In particular, a vibrating beam 4 is connected to an isolator mass 6, which includes two legs 6a and 6b straddling vibrating beam 4. Structure 2 further includes an end mount 8 and a pair of parallel isolator springs 10 and 12. Isolator mass 6 is coupled at a base 14 to the pair of parallel isolator springs, which are in turn connected to end mount 8. As was mentioned in the Weisbord patent, the purpose of the geometry design as shown in FIG. 1A is to maintain the Q factor as high as possible so that the reaction forces of the vibrating beam, that is the bending moment M and the shear reaction V, which are generated at the root of the vibrating beam, designated as 16, would not be transmitted to end mount 8. In other words, the isolator springs and the isolator mass are used to prevent energy losses from the vibrating beam. Of course, it should be appreciated that beam 4 is caused to vibrate by an electronic oscillator circuit, which is conventionally known and thus is not shown.

By design, the combination of isolator mass 6 and isolator springs 10 and 12 would have a very low natural frequency, that is when compared to the frequency of the vibrating beam. For example, the vibrating beam typically vibrates at a frequency of 40K Hz, yet the natural frequency of the isolation system of the resonator is only approximately 5–6K Hz. The difference of the frequencies between the vibrating beam and the isolator system helps to reduce the shear reaction at root 16 of vibrating beam 4. However, in addition to the shear reaction, there is generated at root 16 a moment reaction M, which is an angular reaction that tries to induce angular moment in isolator mass 6, where it is resisted by axial forces generated in isolator springs 10 and 12.

In FIG. 1B, the resonator structure shown in FIG. 1A, which is at the rest position, is shown to be maximally deflected.

FIG. 2 shows an expanded free body diagram which shows all the moment, shear and force reactions present in the structure of FIG. 1B. The moments are designated by M, the shear reactions are designated by V and the axial reactions are designated by F. As shown, the center of gravity C.G. and the beam root are separated by a distance r. As FIG. 2 illustrates only half of a resonator structure, the length of vibrating beam 4 is designated as $L_B/2$. Using the assumptions that the shear and moment reactions of isolator springs 10 and 12 are negligibly small compared to the inertial reactions of the isolator mass at the beam frequency, the axial reaction of vibrating beam 4 is negligible and the axial reactions of isolator springs 10 and 12 are also negligibly small, isolator mass 6 of FIG. 2 can be reduced to that shown in FIG. 3.

By incorporating all of the reactions to the center of gravity C.G. of isolator mass 6, the structure of FIG. 3 can be further reduced to that shown in FIG. 4 wherein a net moment $M_B - rV_B$ is shown. Setting $M_B - rV_B = 0$ and utilizing the relationship of $M_B$ and $V_B$, per the disclosure of Weisbord, it can be shown that $r = 0.215 L_B$. This is the condition of perfect tuning for the beam structure shown in FIG. 1. From this, it is clear that the Weisbord patent teaches that the center of gravity of the isolator mass has to be placed at a very specific location in order to produce an isolation system which uses inertial reactions to cancel moment reactions generated at the root of a vibrating beam.

Figure 5:
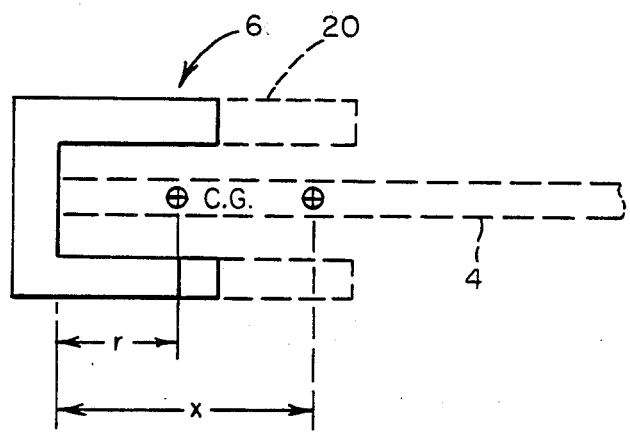
FIG. 5 illustrates an isolator mass which has an overhang added thereto.

However, the criteria which was set forth by Weisbord is difficult to meet. For example, if it is desirable to move the center of gravity C.G. out to a distance X which exceeds the limit proposed by Weisbord (L/6 to L/4), a large overhang 20 needs to be added to isolator mass 6. See FIG. 5. By adding overhang 20, a lot of additional weight will be added to the isolator mass. This additional weight would cause different problems such as, for instance, the fact that the isolator mass itself may have a frequency which becomes close to the frequency of the vibrating beam, thereby exacerbating the shear reactions. Also, if there is any mistuning, due either to linear displacement of the isolator mass or due to angular motion of the isolator mass, there will be some transmission of beam root moment and shear reactions to the mount. For example, if the isolator system is not perfectly tuned, i.e. $M_B \neq rV_B$, the isolating mass would try to rotate and thereby causes an axial reaction $F_S$ to occur to isolator springs. See FIG. 2. It can be shown that the resultant end mount moment reaction $M_R$ is a result of both isolator spring and inertial reactions by the conventional transmissibility equation.

Figure 6:
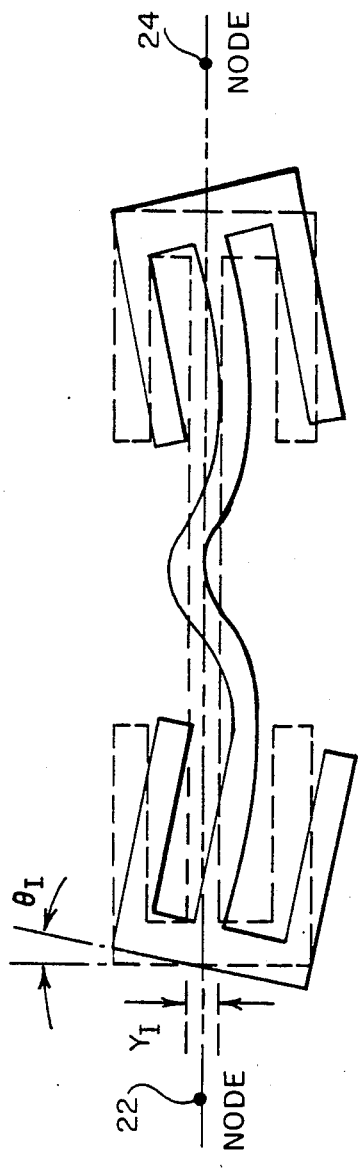
FIG. 6 shows an isolator mass-beam vibrating system.
Figure 7:
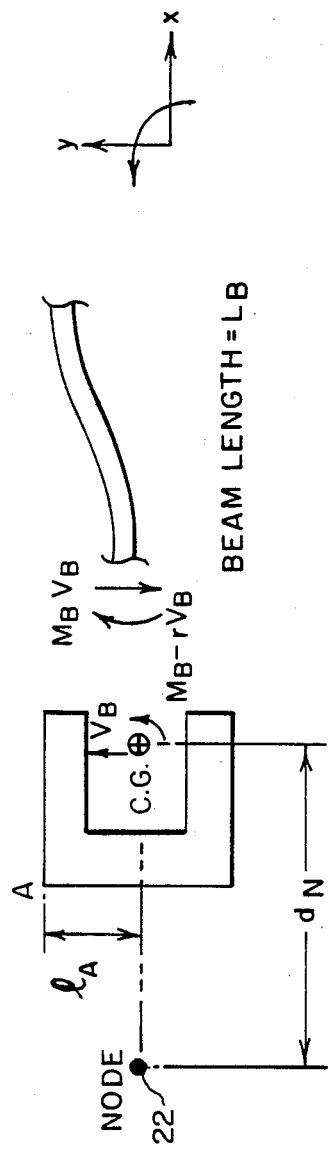
FIG. 7 shows the force and moment reactions at the root of the vibrating beam.

A mistuned isolator mass-vibrating beam system having an angular motion $\theta_I$ and a linar motion $Y_I$ is shown in FIG. 6. As was discussed previously, linear motion $Y_I$ can be taken care of by the teachings of Weisbord. However, angular motion $\theta_I$ remains a problem. Yet, because of the combined linear and angular motions, node points 22 and 24 are formed along the longitudinal axis of the isolator mass-vibrating beam system. It can easily be shown that the structure of FIG. 6 can be expanded into the free body diagram of FIG. 7, wherein the moment and shear reactions, as well as the distance $d_N$ between the center of gravity C.G. of the isolator mass and the node, for this instance 22, are shown. For the sake of clarity, again only half of the structure of FIG. 6 is illustrated in FIG. 7.

By utilizing basic linear and angular motion equations, in conjunction with FIG. 6, it can be shown that the following equations represent the linear motion $Y_I$ and the angular motion $\theta_I$, respectively $$-Y_I = V_B/M_I W_B^2 \qquad (1)$$

$$-\theta_I = \frac{M_B - rV_B}{M_I R_I^2 W_B^2} \qquad (2)$$

where
$R_I$ = the radius of gyration of the isolator mass
$V_B$ = the shear reaction of the vibrating beam
$M_I$ = mass of the isolator mass
$W_B$ = natural frequency of the vibrating beam.

From FIGS. 6 and 7, it can be seen that the relationship between $d_N$, $Y_I$ and $\theta_I$ is as follows:

$$d_N = Y_I/\theta_I \qquad (3)$$

After substituting Equations 1 and 2 into 3, an equation which represents the distance between a node and the center of gravity of the isolator mass is as follows:

$$d_N = \frac{R_I^2}{\left(\frac{M_B}{V_B} - r\right)} \qquad (4)$$

At this point, it should be appreciated that, if $M_B/V_B = r$, then $d_N = \infty$. This is the perfectly tuned Weisbord condition wherein the two isolator springs are positioned in parallel to each other.

Figure 8:
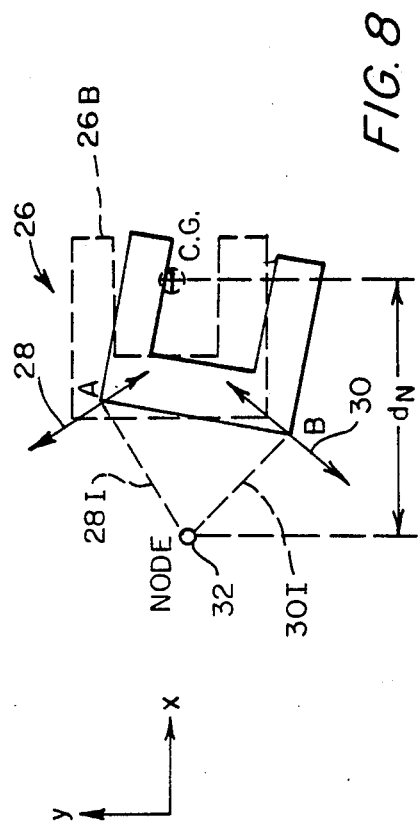
FIG. 8 depicts the loci of motions in an isolation mass.

Referring now to FIG. 8, there is shown in isolator mass 26 junction points A and B whereby isolator springs are to be attached. Due to the combined linear and angular motions, respective loci of points shown as lines 28 and 30 are formed and pass through points A and B, respectively. These lines, as shown, are angled, with respect to the X and Y axes. It should be noted that isolator mass 26 would be oriented in the position as shown by the dotted isolator mass 26b, were the isolator mass perfectly tuned as was in the case of the Weisbord structure. It should further be noted that if isolator mass 26 is oriented at the position as indicated by isolator mass 26b, then loci 28 and 30 would be oriented in the Y direction, with reference to the X and Y axes. Returning now to isolator mass 26 as positioned by the solid line, it can readily be seen that loci 28 and 30 are positioned such that if imaginary lines 28i and 30i, respectively, are drawn from corresponding points A and B to node 32, loci of motions 28 and 30 are oriented perpendicularly to node 32.

Utilizing the idea that were the isolator springs coupled to the isolator mass at the junction indicated by points A and B in such a way that they would be intersecting at a node which previously had been determined by the above-mentioned equations, it can easily be seen that the isolator springs are called upon to move in their most compliant direction; that is, if the isolator springs are coupled to isolator mass 26 at points A and B so that the deflection causes the least reaction, the axis of the isolator springs will be normal to a direction of motion and will meet at the node. Thus, the angles of the isolator springs have to be oriented in such a way that the respective axis of the isolator springs would be perpendicular to the corresponding locus of movement at points A and B. This angling of the isolator springs from an isolator mass is shown in FIG. 9.

Figure 9:
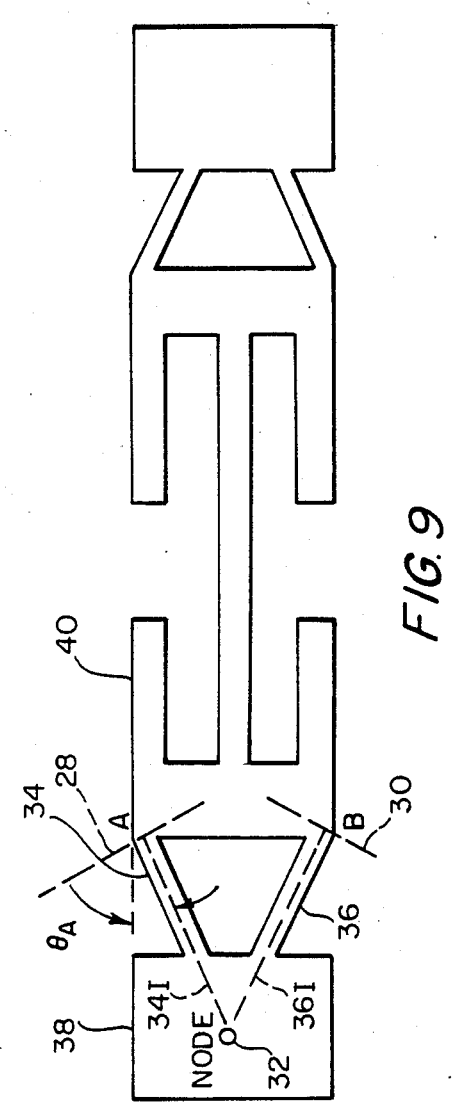
FIG. 9 shows an isolation system of the present invention.
Figure 10:
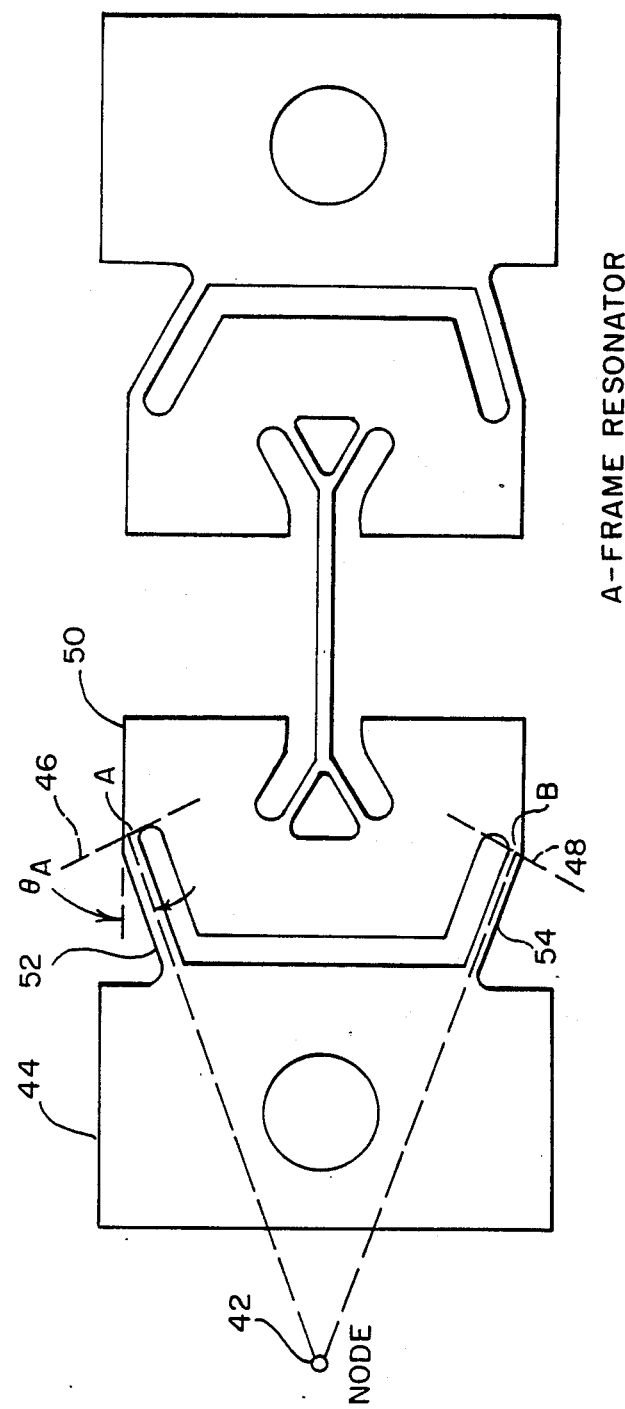
FIG. 10 shows a completely tuned A-frame resonator design.

Discussing only the left portion of the structure of FIG. 9, it is shown that isolator mass 40 is coupled to end mount 38 by means of isolator springs 34 and 36. As shown, the axes of isolator springs 34 and 36, represented by dotted lines 34$i$ and 36$i$, respectively, intersect at node 32. Moreover, these axes 34$i$ and 36$i$ are normal to loci of motion 28 and 30, respectively. Of course, it should be appreciated that the isolator springs are offset from planes parallel to the longitudinal axis of the vibrating beam by an angle $\theta_A$, as illustrated with respect to isolator spring 34. Although node 32 is shown to reside within end mount 38 in the structure of FIG. 9, it should be appreciated that the node where the axis of isolator springs intersect does not necessarily have to reside within the end mount. For example, as shown in FIG. 10, node 42 is located outside of end mount 44. This is due to the fact that the structure of FIG. 10 has a different geometry than that shown in FIG. 9. Consequently, the loci of motion 46 and 48 of the FIG. 10 structure, which we shall call the A-frame resonator, are located at different locations on isolator mass 50. Accordingly, even though the axes of isolator springs 52 and 54 are perpendicular to loci of motion 46 and 48, respectively, they intersect node 42 at a point outside of end mount 44. It necessarily follows that the angle $\theta_A$ of the A-frame resonator is smaller than that of the same for the structure shown in FIG. 9. It should be emphasized that the node, instead of situating, for example to the left of end mount 44, may actually be situated to the right thereof. This is demonstrated in FIG. 11.

Figure 11:
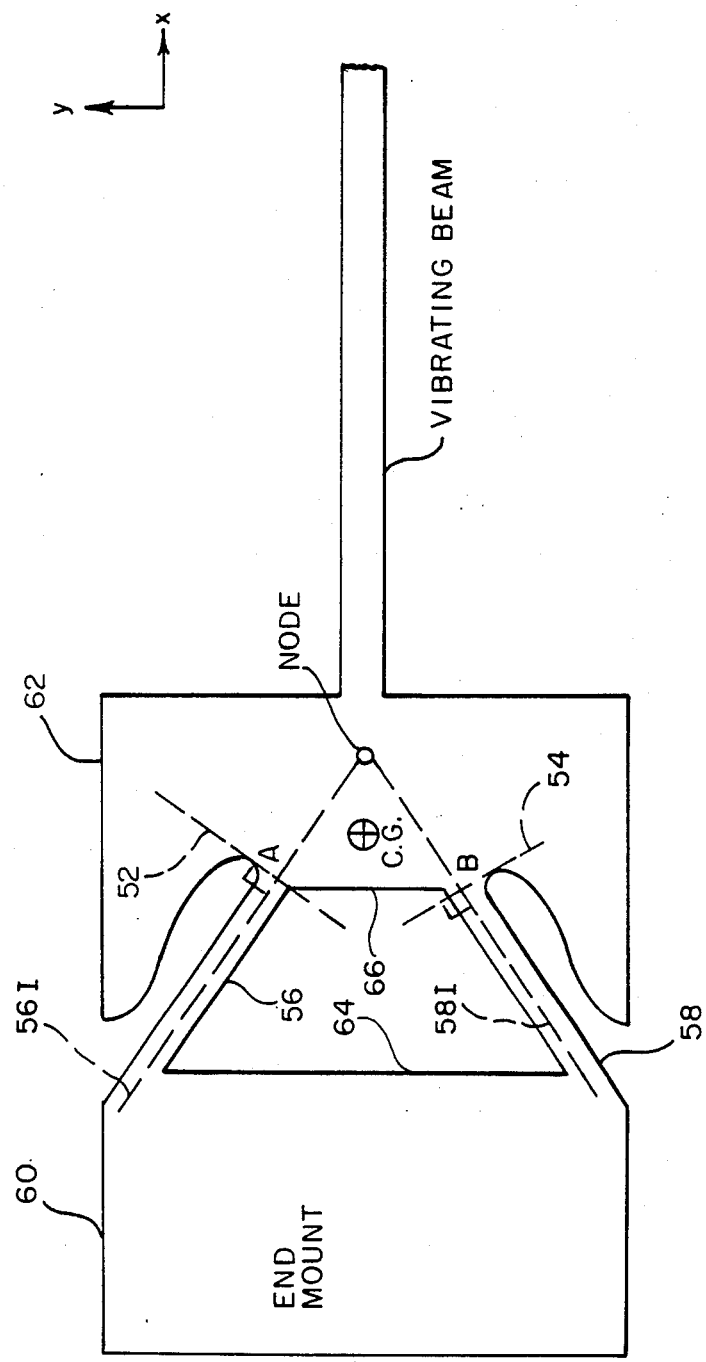
FIG. 11 is an alternate embodiment of the isolation system of the present invention.

As drawn, FIG. 11 shows an alternate design of the isolation system for a vibrating beam resonator. As shown, axes 56$i$ and 58$i$ of isolator springs 56 and 58, respectively, intersect node 64 at a position which is located within isolator mass 62. This is due to the fact that the geometry of isolator mass 62 is quite different from those of the earlier figures. Consequently, instead of intersecting at a node located to the left of base 64 of end mount 60, the axes of the isolator springs intersect at a node located to the right of base 66 of isolator mass 62. Thus, it should be appreciated that the isolator springs can be angled in both directions, that is projecting obliquely toward the end mount or projecting obliquely toward the isolator mass.

Although the present invention discloses a new isolator design and a new method for bringing about this design, it should be emphasized that a combination of the present invention with that which was disclosed by Weisbord is feasible. For example, it may be much easier, in a manufacturing process, to adjust both the location of the center of gravity of an isolation mass and the angle of the isolator springs than to adjust only one of them.

While a preferred embodiment of the invention is disclosed herein for purposes of explanation, numerous changes, modifications, variations, substitutions and equivalents, in whole or in part, will now be apparent to those skilled in the art to which the invention pertains.

Accordingly, it is intended that the invention be limited only by the spirit and scope of the appended claims.

I claim:
1. An apparatus comprising:
   a member adapted to vibrate in a plane along the longitudinal axis;
   means connected to the member for maintaining the vibration of the member at a characteristic frequency;
   an isolation mass secured to each end of the member, each isolation mass including a base extending transversely from the longitudinal axis in both directions;
   an end mount positioned in parallel spaced relation to the base of each isolation mass;
   a pair of non-parallel spaced isolator springs coupling each isolation mass to the corresponding end mount, each isolator spring being positioned perpendicularly to a locus of motion located proximately at the base of the isolation mass, the locus of motion intersecting the junction of the base where the isolation spring is coupled to the isolation mass, the locus of motion being representative of the direction of motion of the force and moment reactions produced at the root of the vibrating member;
   whereby energy losses from the vibrating member are substantially eliminated.

2. The apparatus according to claim 1, wherein each non-parallel spaced isolator spring is angled obliquely toward the longitudinal axis from the base of the isolation mass to the corresponding end mount, respective axes of the isolator springs intersecting at a node located in the direction away from the vibrating member and the junction where the springs are coupled to the base.

3. The apparatus according to claim 1, wherein each non-parallel spaced isolator spring is angled obliquely toward the longitudinal axis from the corresponding end mount to the base of the isolation mass, the axes of the isolator springs intersecting at a node located away from the junction of the isolation mass where the springs are coupled.

4. The apparatus according to claim 2, wherein the member is a beam.

5. The apparatus according to claim 3, wherein the member is a beam.

6. The apparatus according to claim 1, wherein the apparatus is made of piezoelectric material.

7. The apparatus according to claim 1, wherein the apparatus is made of quartz.

8. The apparatus according to claim 1, wherein the apparatus is made of metal.

9. In an apparatus including a vibrating member, an isolation mass secured to each end of the vibrating member and an end mount positioned in spaced relation to each isolation mass, a method of preventing energy losses from the vibrating member, comprising:
   interposing between each isolation mass and the corresponding end mount a pair of non-parallel spaced isolator springs for coupling the isolation mass to the corresponding end mount;
   positioning each isolator spring perpendicularly to a locus of motion located in the isolation mass, the locus of motion intersecting the junction where the isolator spring is coupled to the isolation mass, the location of motion being representative of the direction of motion of the force and moment reactions produced at the root of the vibrating member;

thereby preventing energy losses from the vibrating member.

10. The method according to claim 9, wherein the positioning step further comprises:
   angling each isolator spring obliquely from the base of the isolation mass to the corresponding end mount; and
   projecting the axes of the isolator springs toward the longitudinal axis of the vibrating member;
   thereby intersecting the node located in the direction away from the vibrating member and the junctions of the isolation mass where the isolator springs are coupled.

11. The method according to claim 9, wherein the positioning step further comprises:
   angling each isolator spring obliquely from the corresponding end mount to the isolation mass;
   projecting the axes of the isolator springs toward the longitudinal axis of the vibrating member;
   thereby intersecting a node located away from the junctions of the isolator mass where the springs are coupled.

* * * * *